(12) United States Patent
Guattari et al.

(10) Patent No.: US 8,953,913 B2
(45) Date of Patent: Feb. 10, 2015

(54) INTEGRATED OPTICAL CIRCUIT WITH AN OFF-CENTER GROOVE

(71) Applicant: Ixblue, Mary Le Roi (FR)

(72) Inventors: Frederic Guattari, Aubervilliers (FR); Herve Lefevre, Paris (FR)

(73) Assignee: Ixblue, Marly-le-Roi (FR)

( * ) Notice: Subject to any disclaimer, the term of this patent is extended or adjusted under 35 U.S.C. 154(b) by 0 days.

(21) Appl. No.: 13/759,315

(22) Filed: Feb. 5, 2013

(65) Prior Publication Data
US 2013/0202250 A1 Aug. 8, 2013

(30) Foreign Application Priority Data
Feb. 7, 2012 (FR) ..................................... 12 51132

(51) Int. Cl.
*G02B 6/122* (2006.01)
*G02B 6/126* (2006.01)
*G02B 6/30* (2006.01)

(52) U.S. Cl.
CPC ................ *G02B 6/122* (2013.01); *G02B 6/126* (2013.01); *G02B 6/30* (2013.01)
USPC ........................................................ 385/14

(58) Field of Classification Search
CPC ............ G02B 6/122; G02B 6/12; G02B 6/32; G02B 6/42; G02B 6/43; G02B 6/26; G02B 27/14
USPC ........................................................ 385/14
See application file for complete search history.

(56) References Cited

U.S. PATENT DOCUMENTS

| | | | | |
|---|---|---|---|---|
| 5,321,779 A * | 6/1994 | Kissa | | 385/14 |
| 5,475,772 A | 12/1995 | Hung et al. | | |
| 6,351,575 B1 * | 2/2002 | Gampp et al. | | 385/14 |
| 7,039,280 B2 * | 5/2006 | Hata et al. | | 385/50 |
| 7,366,372 B2 * | 4/2008 | Lange | | 385/29 |
| 2002/0076161 A1 * | 6/2002 | Hirabayashi et al. | | 385/40 |
| 2005/0100275 A1 * | 5/2005 | Kimura | | 385/31 |
| 2007/0201792 A1 * | 8/2007 | Lange | | 385/29 |
| 2008/0008419 A1 * | 1/2008 | Krahenbuhl et al. | | 385/33 |
| 2008/0019632 A1 * | 1/2008 | Ishii et al. | | 385/2 |

FOREIGN PATENT DOCUMENTS

| | | |
|---|---|---|
| EP | 1 111 412 A1 | 6/2001 |
| EP | 1 111 413 A1 | 6/2001 |
| JP | 7-181045 A | 7/1995 |

OTHER PUBLICATIONS

French Search Report, dated Sep. 11, 2012, from corresponding French application.

* cited by examiner

*Primary Examiner* — Kaveh Kianni
(74) *Attorney, Agent, or Firm* — Young & Thompson

(57) ABSTRACT

An integrated optical circuit includes a substrate having an input face, an output face, a lower face and an upper face, an optical waveguide extending between a first end located on the input face of the substrate and a second waveguide end located on the output face of the substrate. The integrated optical circuit further includes at least one off-center groove, the off-center groove extending from the lower face to the inside of the substrate, the at least one off-center groove being located at a non-zero distance d from the median plane, the off-center groove replacing a central groove and the at least one off-center groove being capable of attenuating the non-guided optical beam transmitted by the substrate between the first end and the second end.

20 Claims, 4 Drawing Sheets

Fig. 10-A
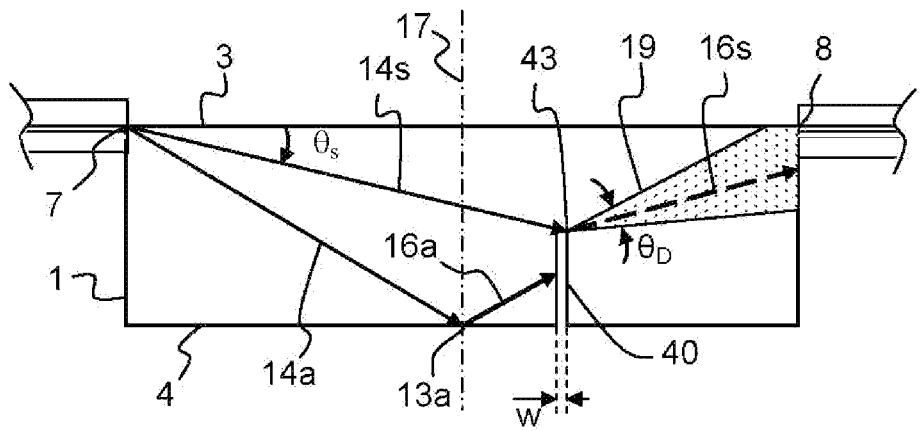
Fig. 10-B
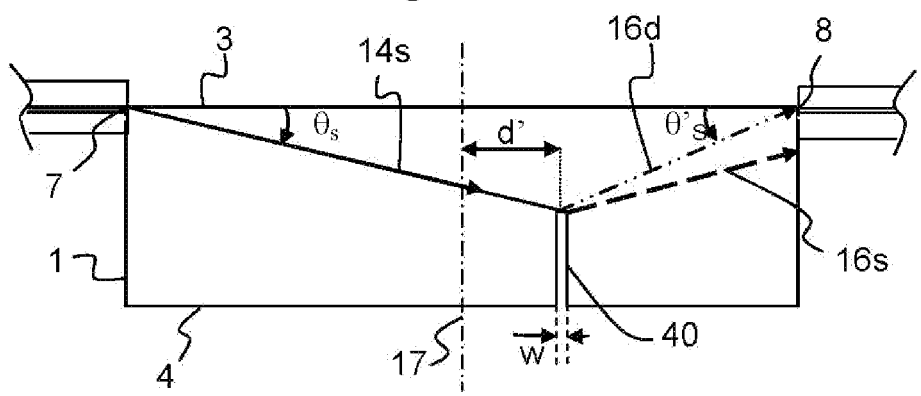
Fig. 11
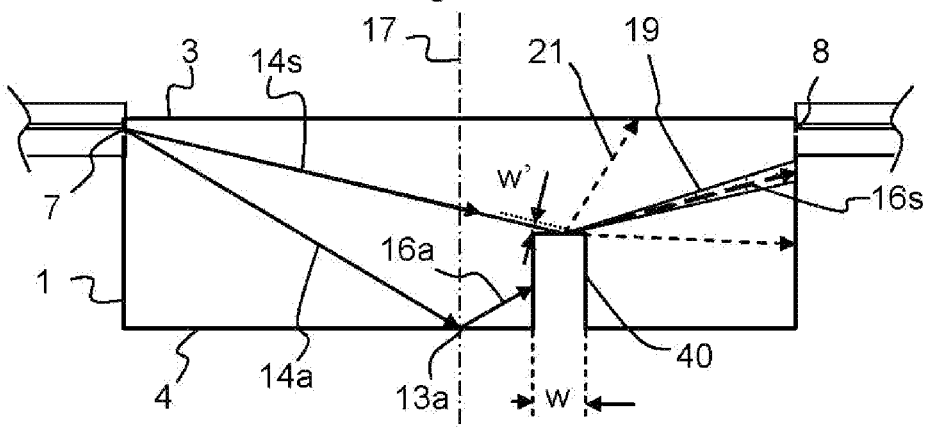

INTEGRATED OPTICAL CIRCUIT WITH AN OFF-CENTER GROOVE

FIELD OF THE INVENTION

The present invention relates to an integrated optical circuit comprising a generally planar substrate and at least one optical waveguide. More precisely, the invention relates to an integrated optical circuit (IOC) comprising means for attenuating the propagation of spurious optical waves via the substrate.

BACKGROUND OF THE INVENTION

The making of integrated optical circuits is based on the use of microlithography techniques that allow mass production. A single-mode optical waveguide may be made on a planar substrate through steps of masking and deposition of a narrow strip of material, possibly followed by a step of thermal diffusion. In an integrated optical circuit, such as in an optical fiber, the effect of optical guiding is linked to a difference of refraction index between the optical waveguide and the substrate, the waveguide refraction index being higher than that of the substrate. Various materials may be used for the making of integrated optical circuits, such as III-V semiconductors, silica on silicon, glass or lithium niobate ($LiNbO_3$) or lithium tantalate ($LiTaO_3$). The lithium tantalate and the lithium niobate are particularly interesting materials because they have a Pockels electro-optic effect. By arranging electrodes on either side of the integrated waveguide, it is possible to modulate the waveguide index and thus to modulate the phase of an optical signal propagating in the waveguide. In an integrated optical circuit where the electrodes are separated by about ten microns, the application of a voltage of only a few volts is sufficient to generate an electric field and to induce the desired phase modulation. By comparison, in a conventional optical phase modulator, the electrodes being separated by at least one millimeter, the electric voltage required to generate a same electric field between the electrodes is of several hundreds of volts.

Various technologies of making lithium-niobate integrated optical circuits have been developed: first the titanium (Ti) diffusion technique, then the proton exchange technique. The titanium diffusion technique consists in depositing a titanium strip on the surface of a lithium niobate substrate, then heating the substrate so that the titanium diffuses into the substrate and locally increases the refraction index. The titanium diffusion technique requires a high temperature (900 to 1100° C.). The proton exchange technique consists in placing a birefringent $LiNbO_3$ crystal in an acid bath so as to replace Li+ ions by H+ ions (i.e. protons). The proton exchange technique is performed at a lower temperature than the titanium diffusion. Moreover, the technique of proton exchange on a birefringent $LiNbO_3$ crystal has for effect both to increase the extraordinary index of the crystal, which creates guidance for a polarization according to the extraordinary axis, and to reduce the ordinary index of the crystal, so that a polarization according to the ordinary axis is not guided. In the proton-exchange $LiNbO_3$ circuits, the usual configuration is an X-cut, the X axis of the single-axis birefringent $LiNbO_3$ crystal being perpendicular to the surface of the substrate, while the Y and Z axes of the crystal are parallel to the surface. The waveguide propagation axis is parallel to the Y direction, and the TE mode ("Transverse Electric" mode, i.e. the electric field is parallel to the surface of the substrate) is parallel to the Z direction. In this case, the proton-exchange optical waveguide guides only the TE polarization state, the TM cross-polarization state ("Transverse Magnetic" mode, i.e. the magnetic field is parallel to the surface of the substrate and thus the electric field is perpendicular to the surface of the substrate) propagating freely in the substrate. The lithium-niobate proton-exchange technique thus allows making a polarizer on integrated optical circuit.

Many integrated optical circuits are thus made from lithium niobate: polarizer, phase modulator, Mach-Zehnder interferometer, Y junction, 2×2 coupler or 3×3 coupler. Advantageously, a same optical circuit integrates several functions on a same substrate, which allows improving the compactness and reducing the optical connections. The lithium-niobate proton-exchange integrated optical circuits find applications in particular in the optical fiber gyroscopes.

In an integrated optical circuit, an input beam is generally coupled to an end of an optical waveguide through an optical fiber. However, only certain modes (for example, polarization mode) are guided by the waveguide, the other modes propagating freely in the substrate. Moreover, if the core of the fiber is not perfectly aligned with the waveguide of the integrated optical circuit, a part of the incident light beam may be coupled in the substrate and propagate outside the waveguide. A part of the light that is not guided by the waveguide may be reflected by total internal reflection on one or several faces of the substrate. In fine, a part of this non-guided light may be coupled to an output optical fiber facing another end of the waveguide. The non-guided light may thus disturb the operation of an integrated optical circuit. For example, in the case of a lithium-niobate proton-exchange polarizer, the polarization rejection rate may be affected by the coupling of light transmitted in a non-guided way by the substrate. Likewise, in the case of a 2×2 or 3×3 coupler, the non-guided light may be coupled via the substrate from an input to an output of the integrated optical circuit.

FIG. 1 schematically shows a perspective view of an integrated optical circuit according to the prior art. The integrated optical circuit comprises a planar substrate 10. By convention in the present description, the substrate 10 comprises an input face 1, an output face 2, a lower face 4, an upper face 3 and two side faces 5. The lower face 4 and the upper face 3 extend between the input face 1 and the output face 2. The lower face 4 and the upper face 3 are opposite to each other. Preferably, the lower face 4 and the upper face 3 are planar and parallel to each other. Likewise, the side faces 5 are planar and parallel to each other and extend between the input face 1 and the output face 2. The input face 1 and the output face 2 of the substrate may also be planar and polished, but they are preferably cut with an inclination angle so as to avoid the spurious back-reflections at the ends of the waveguide. The substrate 10 comprises a rectilinear optical waveguide 6 that extends between a first end 7 on the input face 1 and a second end 8 on the output face 2. By convention, the waveguide 6 is nearer the upper face 3 than the lower face 4. In the case of a lithium-niobate proton-exchange polarizer, the optical waveguide 6 is located below the upper face 3 of the substrate and extends in a plane parallel to the upper face 3. The optical waveguide 6 may be delimited by the upper face or be buried just below this upper face. In other types of IOC, the waveguide 6 may be deposited on the upper surface 3 or may extend inside the substrate, for example in an plane parallel to the upper face 3, half the way between the lower face 4 and the upper face 3. An input optical fiber 20 and an output optical fiber 30 are optically coupled to the first end 7 and the second end 8, respectively, of the waveguide 6. The input optical fiber 20 transmits an optical beam in the integrated optical circuit. A part of the optical beam is guided by the waveguide. The guided beam 12 propagates up to the end 8 of the waveguide 6 facing the output fiber 30. Due to a mode mismatch between the core of the optical fiber 20 and the integrated waveguide 6, another part of the beam is not coupled in the waveguide and propagates freely in the substrate 10. A non-guided beam 14 then propagates in the substrate, down to the lower face 4 of the substrate. A part of the non-guided beam 14 may be reflected by total internal reflection on the lower face 4. A part of the reflected beam 16 may then be transmitted up to the end of the substrate facing the output fiber 30. The output fiber 30 may thus collect not only the guided optical beam 12, but also a part of the non-guided and reflected optical beam 16. FIG. 1 shows only a single reflection on the lower face 4 of the substrate, half the way between the input face 1 and the output face 2, i.e. at the center of the lower face 4. Other multiple internal reflections are also possible.

FIG. 2 shows a sectional view of the integrated optical circuit of FIG. 1, on which is schematically shown the angular distribution of the light power P of the non-guided optical beam in the substrate. The plane of FIG. 2 is defined as being an incidence plane passing through the first end 7 and the second end 8 and perpendicular to the lower face 4. It is observed that a rather high part of the optical beam is optically coupled in the substrate. The non-guided optical wave undergoes a total internal reflection on the upper surface 3. Therefore, the non-guided optical wave is subjected to an interferometric effect of the Lloyd-mirror type on the upper face 3 of the substrate. This results in a Lloyd-mirror interferometer, with interferences occurring between the input fiber 20 and its virtual image. Further, the total internal reflection produces a phase-shift of π. Accordingly, the central fringe of the interferogram, located on the upper face 3, is a black fringe. This explains that the density of power of the non-guided light propagating directly is drastically reduced just below the upper face 3, where the output optical fiber is placed (cf. H. Lefèvre, The fiber optic gyroscope, Artech House, 1992, Annex 3 Basics of Integrated Optics, pp. 273-284). Consequently, a proton-exchange polarizer should have in theory a very high polarization rate of −80 to −90 dB.

However, there exist other couplings of the non-guided optical beam than the direct transmission. Indeed, the substrate may transmit various non-guided beams propagating by internal reflection, in particular on the lower face 4, but also on the upper face 3 or on the side faces 5. Non-guided spurious beams propagating by internal reflection on the faces of the substrate may arrive near a waveguide end 8 on the output face 2 of the substrate.

Generally, the non-guided beams reflected inside the substrate may affect the quality of the signals transmitted in the waveguide of an integrated optical circuit. In the case of a lithium-niobate proton-exchange polarizer, cut following an X plane and comprising an integrated waveguide according to the propagation axis, Y, the guided beam 12 is generally a TE polarization beam and the non-guided beam 14 is a TM polarization beam. Due to the internal reflections of non-guided light in the substrate, the polarization rejection rate of a proton-exchange polarizer according to the schema of FIG. 1 is in practice limited to about −50 dB. Further, the quality of an integrated polarizer influences the performance of certain applications, in particular in an optical fiber gyroscope. It is therefore necessary to improve the rejection rate of an integrated-waveguide polarizer. More generally, it is desirable to improve the optical quality of an integrated optical circuit and to reduce the quantity of non-guided spurious light transmitted by the substrate outside the optical waveguide.

Various solutions have been proposed to solve the problem of spurious coupling of non-guided optical beams between a waveguide input and a waveguide output in an integrated optical circuit.

It is generally admitted that the main contribution to the spurious light comes from the primary reflection of a non-guided beam 14a at a primary reflection point 13a located at the center of the lower face 4 between a first waveguide end 7 on the input face 1 and a second waveguide end 8 on the output face 2. In order to suppress the primary reflection on the lower face of a substrate 4, an integrated optical circuit has been developed, comprising a central groove 25a arranged at the middle of the lower face 4 (cf. the perspective view of FIG. 3 and the top view of FIG. 4). In FIG. 4 is shown the layout of a median plane 17, which is defined as being a plane perpendicular to the lower face 4, perpendicular to a line segment joining the first and the second waveguide ends and which passes through the middle of this line segment. A middle point 18 is defined, which is located at the middle of the line segment joining the first end 7 and the second end 8 of the waveguide 6. The central groove 25a extends over the whole width of the substrate according to a direction perpendicular to the direction of the waveguide 6. However, if a central groove 25a stops the non-guided beam 14a reflecting at the center of the lower face 4 of the substrate, it does not stop the multiple internal reflections occurring between the lower face 4 and the upper face 3. FIG. 5 shows an example of a part of a non-guided optical beam 14b propagating between a first waveguide end 7 and a second waveguide end 8, through double reflection on the lower face and simple reflection on the upper face to form a multiple reflection spurious beam 16b. Therefore, a central groove on the lower face of the substrate allows improving the rejection rate of a proton-exchange polarizer by several orders of magnitude, but the rejection rate remains limited in practice to about −65 dB.

In the case of a Y junction, the U.S. Pat. No. 7,366,372 proposes to arrange a first central groove 25a on the lower face of the integrated optical circuit, half the way between the input face 1 and the output face 2, so as to suppress the primary reflection, and a second central groove 25b on the upper face, arranged between the legs of the Y junction, and half the way between the input face and the output face, so as to suppress the part of the non-guided beam 14b propagating by multiple reflection in the substrate and reflecting on the middle of the upper face (see the sectional view of FIG. 6). However, the central groove 25b on the upper face 3 must not cut the waveguide 6 and is thus limited laterally so as not to cut the legs of the Y junction. This solution is not generalizable to other types of optical integrated circuits.

The U.S. Pat. No. 5,321,779 describes an IOC comprising at least one central groove, extending in the median plane, half the way between the input face and the output face of the IOC, and possibly two side grooves arranged at ¼ and ¾ of the length of the substrate, respectively. According to this document, the effect of the central groove is to attenuate the primary reflection at the central point. As a complement, the effect of the side grooves at ¼ and ¾ of the length is to attenuate multiple reflections between the lower face and the upper face. The grooves at ¼ and ¾ do not affect the primary reflection. However, it is experimentally observed that the presence of side grooves at ¼ and ¾ of the substrate length, on either side of a central groove, reduces only marginally the recoupling of the non-guided spurious light, compared to an IOC having only one central groove.

SUMMARY OF THE INVENTION

The invention aims to propose an alternative solution to the formation of an absorbing central groove on the lower face of an optical integrated circuit. More precisely, one object of the invention is to propose an integrated optical circuit that is robust and that allows reducing the rate of transmission of non-guided spurious light in the substrate. Another object of the invention is to reduce the spurious coupling (cross-coupling) rate between input ports and output ports, in an optical integrated circuit having several input ports and/or several output ports.

The present invention aims to remedy the drawbacks of the prior arts and relates, more particularly, to an integrated optical circuit comprising a substrate, said substrate including an input face, an output face, a lower face and an upper face, two side faces, said lower face, upper face and side faces extending between the input face and the output face, the upper face being planar and opposite to the lower face; at least one optical waveguide located in a plane parallel to the upper face, said at least one optical waveguide extending between said input face and said output face; at least one first waveguide end located on the input face of the substrate and at least one second waveguide end located on the output face of the substrate; said integrated optical circuit being capable of receiving an incident optical beam on said first waveguide end, of forming a guided optical beam propagating in an optically guided manner, and of forming a non-guided optical beam propagating in a non-guided manner in the substrate.

There being defined: a median plane perpendicular to the upper face and to a line segment joining the first and the second waveguide ends, said median plane passing through the middle of said line segment; an incidence plane perpendicular to the median plane, said incidence plane passing through the first and the second ends, and a primary reflection point located on the lower face at the intersection of the median plane and the incidence plane.

According to the invention, the integrated optical circuit includes at least one groove off-centered with respect to the median plane, said at least one off-center groove extending from the lower face to the inside of the substrate, said at least one off-center groove being located at a non-zero distance d from said median plane, said at least one off-center groove replacing a central groove located in the median plane and said at least one off-center groove having a height h in the incidence plane, said height h being higher than a minimum height $h_{min}$, such that:

$$h_{min} = \frac{2 \times e \times d}{L} + \sqrt{\frac{D \times \lambda}{2}}$$

where L represents the length of the substrate, e the thickness of the substrate, d the distance between said off-center groove and the median plane, λ the wavelength in the material of a non-guided optical beam in the substrate, and D is equal to (L/2−d), said at least one off-center groove being capable of attenuating said non-guided optical beam transmitted by said substrate between said first end and said second end.

According to various particular and advantageous aspects of the invention:
said at least one off-center groove has a width w such that:

$$w >> \frac{\lambda}{2 \times \theta_S \times (\theta'_S - \theta_S)}$$

so as to limit the angle of diffraction on the bottom of the off-center groove, where $\theta_S$ represents the grazing incidence angle of a non-guided optical beam on the bottom of said off-center groove and $\theta'_S$ represents the angle formed between the upper face of the substrate and a segment extending from the middle of the bottom of the groove to the second end of the waveguide;
said at least one off-center groove extends in a plane parallel to the median plane;
said at least one off-center groove extends in a plane parallel to the input face and/or the output face of the substrate;
said at least one off-center groove includes a flat bottom;
said flat bottom has an optically polished surface so as to limit the diffusion towards the second end.

According to other particular aspects:
the integrated optical circuit includes a single one off-center groove extending from the lower face to the inside of the substrate;
said at least one groove has a rectangular, trapezoidal or dovetail section;
said at least one off-center groove extends from a side face of the substrate to the opposite side face of the substrate.

According to a preferred embodiment, said substrate is a lithium niobate crystal and said at least one waveguide is a polarizer waveguide formed by proton exchange.

The invention will find a particularly advantageous application in an integrated circuit of the proton-exchange polarizer type.

The present invention also relates to the characteristics that will become evident from the following description and that will have to be considered either alone or in any technically possible combination thereof.

BRIEF DESCRIPTION OF THE DRAWINGS

The invention will be better understood and other objects, details, characteristics and advantages of the latter will appear more clearly from the description of one or more particular embodiments of the invention, given only by way of illustrative and non-limitative example, with reference to the appended drawings. In these drawings:

FIGS. 10-A and 10-B schematically show a sectional view of an integrated optical circuit, considering the diffraction;

FIG. 11 schematically shows a sectional view of an integrated optical circuit, considering the diffraction and the diffusion.

DETAILED DESCRIPTION OF THE INVENTION

Figure 1:
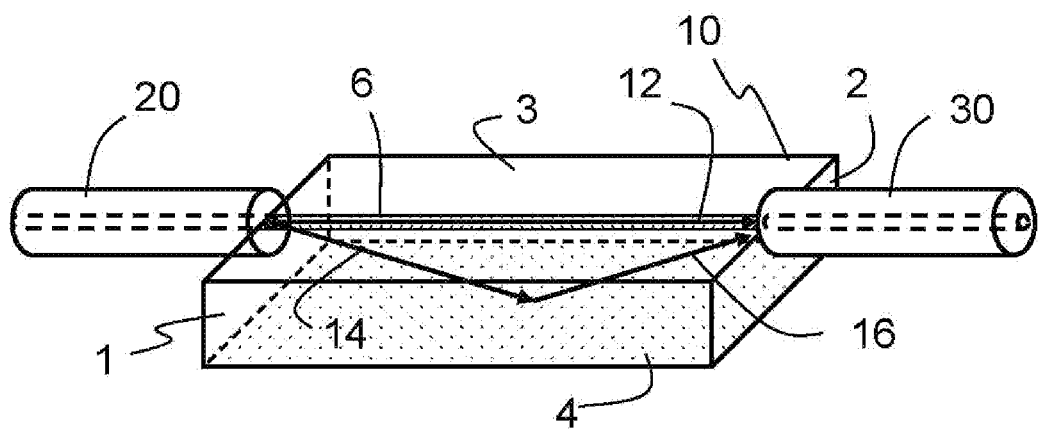
FIG. 1 schematically shows a perspective view of an integrated optical circuit according to the prior art.
Figure 2:
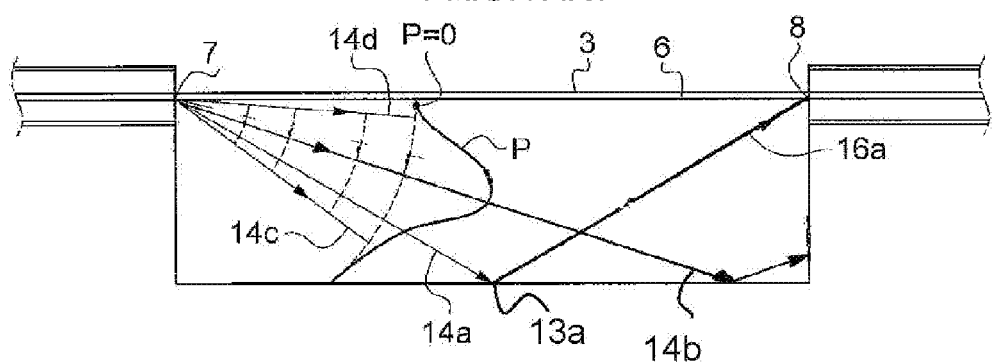
FIG. 2 schematically shows the angular distribution of the light power P of a non-guided optical beam in an integrated optical circuit such as that of FIG. 1, in sectional view.
Figure 3:
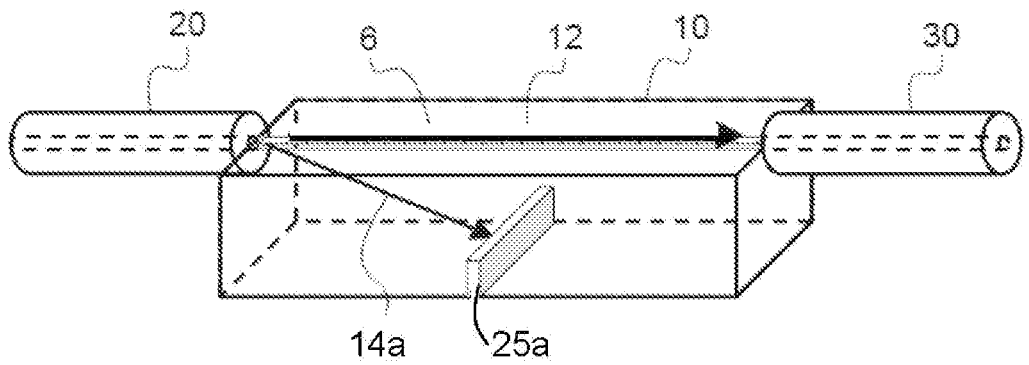
FIG. 3 schematically shows a perspective view of an integrated optical circuit comprising a central groove according to the prior art.
Figure 4:
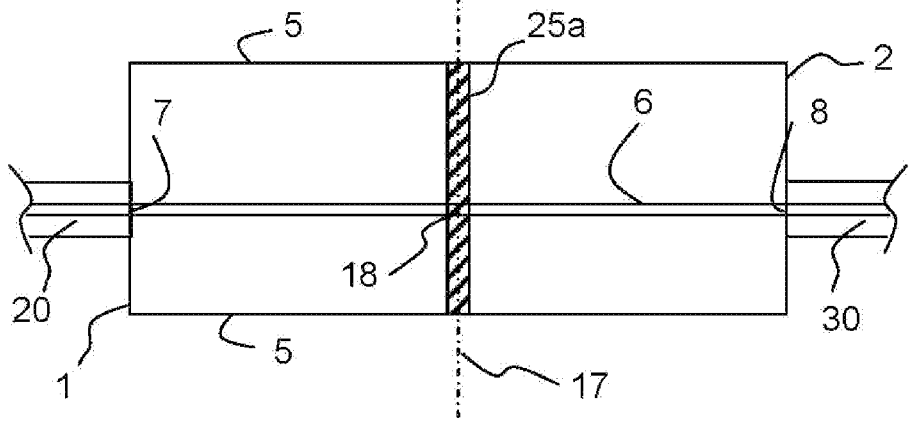
FIG. 4 schematically shows a top view of an integrated optical circuit with a central groove according to the prior art.
Figure 5:
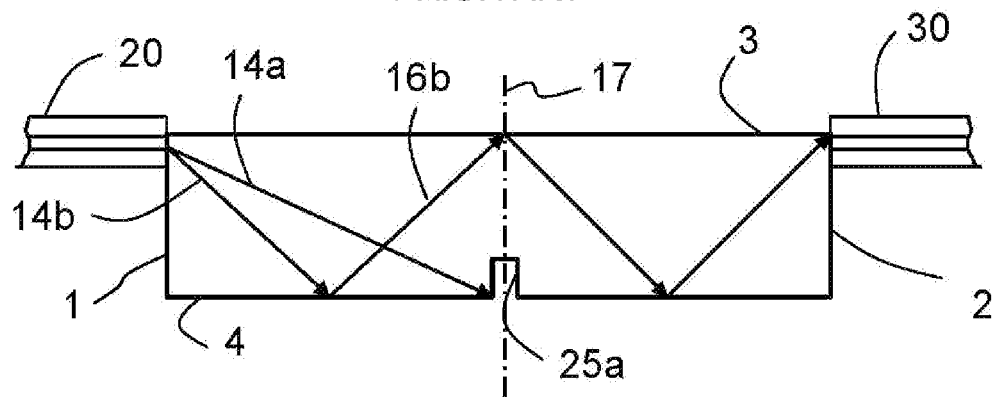
FIG. 5 schematically shows the propagation of a non-guided optical beam in an IOC with a central groove according to the prior art.
Figure 6:
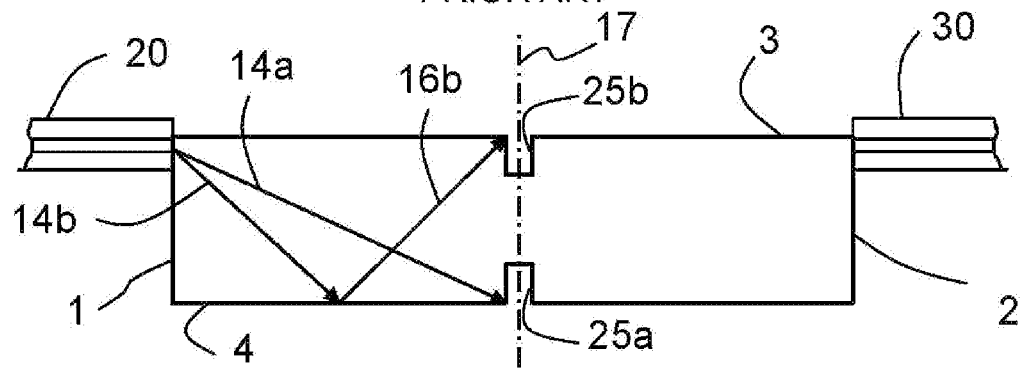
FIG. 6 schematically shows a sectional view of a Y junction comprising a groove on the lower face and a groove on the upper face according to the prior art.
Figure 7:
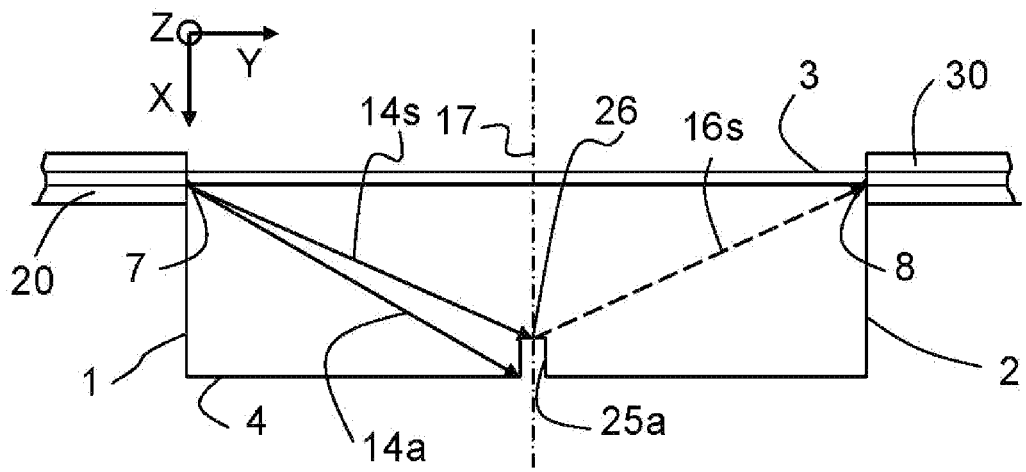
FIG. 7 schematically shows a sectional view of an integrated optical circuit comprising a central groove on the lower face and a specular-reflection spurious beam on the bottom of the central groove.

An observation that is part of the present invention is that, in an integrated circuit comprising a central groove 25a, such as shown in FIGS. 3 to 6, a residual fraction of spurious light may nevertheless be optically coupled between a first waveguide end 7 on the input face 1 and a second waveguide end 8 on the output face 2. FIG. 7 shows a sectional view of an integrated optical circuit with a central groove. The integrated optical circuit comprises a substrate, having an input face 1, an output face 2, a lower face 4 and an upper face 3. The lower face 4 and the upper face 3 are planar and parallel to each other. The substrate also includes two side faces 5 parallel to the plane of the figure. In FIG. 7, the integrated optical circuit also includes an optical waveguide 6 having a first end 7 on the input face 1 and a second end 8 on the output face 2. In the following of the description, it is supposed that the ends 7 and 8 are located almost in the plane of the upper face 3. The plane of FIG. 7 is a plane passing through the two waveguide ends 7 and 8 and perpendicular to the lower face 3 and/or upper face 4. A median plane 17 is defined, which is perpendicular to the lower face 4 and which passes through the middle of a line segment joining the first end 7 and the second end 8. In other words, the median plane 17 is located half the way between the input face 1 and the output face 2. The median plane 17 is perpendicular to the plane of FIG. 7. The layout of the median plane 17 is represented in FIG. 7 by a dash-point line. The XYZ system represents a Cartesian coordinate system: the Y axis extends in the plane of the upper face 3, parallel to the line segment joining the first end 7 and the second end 8; the X axis is perpendicular to the Y axis and parallel to the incidence plane; and the Z axis is perpendicular to the incidence plane. In the case of a proton-exchange IOC, this XYZ system corresponds to the crystal axes of the lithium niobate.

Figure 8:
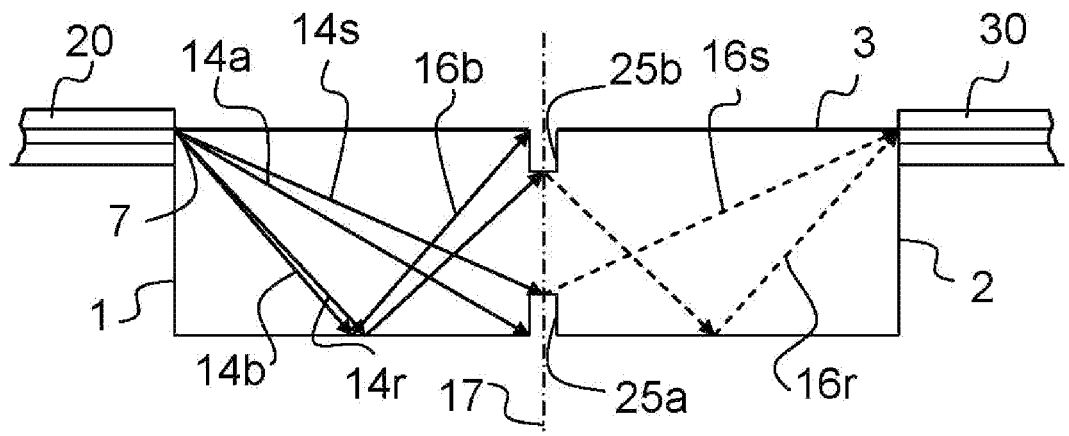
FIG. 8 schematically shows a sectional view of an integrated optical circuit comprising a central groove on the lower face, a central groove on the upper face and specular-reflection spurious beams on the bottoms of the two central grooves.

In FIG. 7, the integrated optical circuit includes a central groove 25a extending in the median plane 17 from the lower face 4 to the inside of the substrate. The central groove 25a is generally made by means of a saw and has a bottom 26. The central groove 25a is commonly filled with an optically absorbing material. An observation that is part of the present invention is that, in an integrated circuit comprising a central groove 25a, such as shown in FIGS. 3 to 6, a residual fraction of spurious light may nevertheless be optically coupled between a first waveguide end 7 on the input face 1 and a second waveguide end 8 on the output face 2. Indeed, a part of the non-guided light beam 14s may form a spurious beam 16s by specular reflection on the bottom 26 of the central groove 25a (cf. FIG. 7). A part of the non-guided beam 14s may be specularly reflected on the bottom 26 of a central groove 25a, i.e. the upper facet 26, even when this groove is clear-polished or filled with an absorbing material. The central groove 25 being arranged in the median plane 17, the bottom 26 of the central groove 25 is also in the median plane 17. Likewise, in the case of a Y junction comprising a central groove 25a on the lower face 4 and a central groove 25b on the upper face 3, another part of the non-guided light beam 14r may also form a specular-reflection spurious beam 16r on the bottom of the central groove 25b on the upper face of the substrate towards the output face of the integrated optical circuit (cf. FIG. 8). Due to the symmetry of the device with respect to the central groove, the angle of the specular reflection on the bottom of the central groove produces a reflected beam 16s and/or 16r, which is directed towards the second end 8 of the waveguide 6. By symmetry, the beams 16s and 16r are then coupled in the core of the output optical fiber 30. There results from the present analysis that the contribution of the spurious light by specular reflection on the bottom of a groove is by no means negligible.

Another aspect of the analysis of operation of an IOC with a central groove relates to the relative power of the non-guided beams 14a and 14s of FIG. 7. A central groove 25a contributes to locally moving the reflecting surface of the lower face closer towards an area where the power of the non-guided optical beam is higher. Moreover, the grazing incidence angle $\theta_S$ on the bottom of a central groove is lower than the incidence angle of the primary reflection beam 14a on the center of the lower face. All these elements demonstrate that the presence of a central groove 25a does not make it possible to fully eliminate the spurious light propagating via the substrate between the first and the second waveguide ends.

Figure 9:
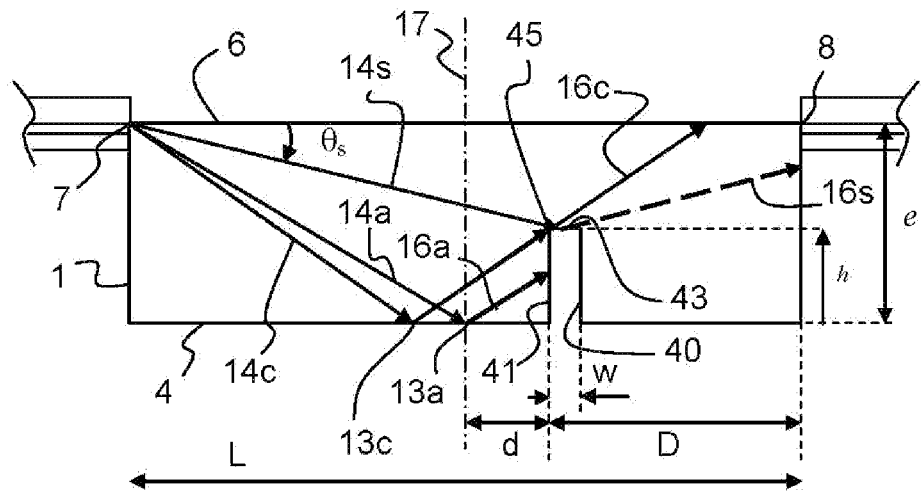
FIG. 9 schematically shows a sectional view of an integrated optical circuit according the a preferred embodiment of the invention.

In FIG. 9 is shown a sectional view of an IOC according to a first embodiment of the invention. The IOC does not include a central groove, but includes instead an off-center groove 40, said off-center groove 40 being offset by a distance d with respect to the median plane 17 towards the output face 2.

The following parameters are defined:
L: length of the substrate between the input face and the output face;
e: thickness of the substrate taken between the lower face and the upper face;
d: distance between the median plane and the beginning of the off-center groove;
w: width of the groove in the substrate length direction;
h: height of the groove in the substrate thickness direction;
$\theta_S$: grazing incidence angle on the bottom of the groove;
$\theta_D$: diffraction angle.

The median plane 17 is located at a distance equal to L/2 from the input face 1 and the output face 2.

The integrated optical circuit of FIG. 9 being deprived of a central groove, the spurious specular reflection 16s on the bottom of the groove 40, directed towards the second waveguide end, is therefore offset.

Advantageously, the off-center groove is defined by one or several parameters so as to optimize the attenuation of the non-guided optical beams: a first parameter relates to the height of the off-center groove and a second parameter relates to the height of the off-center groove.

A first condition about the height of the off-center groove is expressed as follows. The face 41 of the off-center groove 40 on the side of the median plane must have a height h higher than a height $h_1$ so as to intercept and absorb the beam 16a coming from the primary reflection of the non-guided optical beam 14a at the intersection of the median plane and the incidence plane on the lower face 4, i.e. at the primary reflection point 13a. This height $h_1$ is defined as follows:

$$h_1 = \frac{2 \times e \times d}{L}.$$

Moreover, the height of the groove must allow avoiding the contribution of a beam reflected at a reflection point 13c on the lower face 4 and diffracted, by screen-edge diffraction, referred to as the Fresnel diffraction, on the edge 45 of the off-center groove, located at the intersection of the side face 41 and the bottom 43. Taking into account these two contributions, the minimum height $h_{min}$ of the off-center groove is defined as follows:

$$h_{min} = h_1 + \sqrt{\frac{D \times \lambda}{2}}$$

hence:

$$h_{min} = \frac{2 \times e \times d}{L} + \sqrt{\frac{D \times \lambda}{2}}$$

where D represents the distance between the output face 2 and a point 45 tangent to the bottom of the off-center groove 40, along a straight line 16c and λ represents the wavelength in the material of said non-guided optical beam in the substrate. Let's remind that d represents the distance between the median plane 17 and the face 41 of the off-center groove 40, the face 41 being the nearest from the median plan 17. The following is verified: D≈L/2−d.

In practice, an off-center groove is used, having a height equal to about $$1.5 \times \frac{2 \times e \times d}{L}.$$

In the exemplary embodiment, the distance d is equal to L/6 and the thickness e of the substrate is equal to 1 mm, the height h of the off-center groove is equal to about 500 µm.

In FIGS. 10-A and 11 is schematically shown an angle sector of light 19 around the specular-reflection beam 16s on the bottom of the off-center groove 40. The apex angle of the angle sector 19 depends on phenomena of diffraction on the bottom of the groove, as will be detailed with reference to FIGS. 10-A, 10-B and 11. For more clarity, the angle sector of light 19 has not been represented in FIG. 10-B.

FIGS. 10-A and 10-B show an IOC with an off-center groove as defined hereinabove. In FIG. 10-A, the reference 19 denotes the angle sector of diffraction of the non-guided optical beam 16d reflected on the bottom of the off-center groove 40. This is equivalent to a Fraunhofer diffraction through a slot on the bottom of the off-center groove, the slot having an apparent width w'=w×θ$_S$. The angle θ$_D$ of the angle sector of diffraction 19 is thus:

$$\theta_D \approx \frac{\lambda}{w'}$$

hence:

$$\theta_D = \frac{\lambda}{w \times \theta_S}.$$

The diffraction beam 19 has a divergence that is all the more high that the width w of the off-center groove 40 is small. Consequently, a second condition is that the width w of the off-center groove 40 must be large enough to reduce the angle θ$_D$ of the angle sector of diffraction 19 so that the second end 8 is located outside this angle sector of diffraction. A segment 16d may be defined, extending from the middle of the bottom 43 of the groove 40 to the waveguide end 8 (cf. FIG. 10-B). This segment 16d forms an angle θ'$_S$ with the upper face 3 of the substrate. In FIG. 10-B, the distance between the median plane 17 and the middle of the groove 40 is denoted d', with d'=d+w/2. Therefore:

$$\theta_S = \frac{(e-h)}{(L/2+d')} \text{ and } \theta'_S = \frac{(e-h)}{(L/2-d')}.$$

The angle θ$_D$ must respect:

$$\frac{\theta_D}{2} << (\theta'_S - \theta_S)$$

hence:

$$w >> \frac{\lambda}{2 \times \theta_S \times (\theta'_S - \theta_S)}.$$

In an exemplary embodiment, the thickness e of the substrate is equal to 1 mm, the height h of the groove is equal to 0.5 mm, the length of the substrate is of 36 mm, the wavelength λ of the non-guided beam in the material is equal to 0.7 µm (1.5 µm in the vacuum, with an index of 2.15 for the lithium niobate), the distance d' is equal to L/6, i.e. 6 mm. The width w of the off-center groove 40 must then be larger than about 800 µm.

In FIG. 11 is shown an IOC having a large width w so as to reduce the opening of the angle sector of diffraction 19. The off-center groove 40 has a flat bottom 43, made for example by means of a saw, a cutting laser. The flat bottom 43 of the off-center groove contributes to the diffusion of the reflected beam 16s in a diffusion cone 21. According to a preferred embodiment, the flat bottom 43 of the off-center groove 40 is polished and not clear-polished, so as to reduce the light power in the diffusion cone 21.

The integrated optical circuit with an off-center groove may be used in the two directions of propagation of the optical signals.

According to a preferred embodiment, the integrated optical circuit comprises a single one off-center groove at a distance d equal to ⅙ of the length L of the substrate. In the exemplary embodiments of FIGS. 9 to 11, the off-center groove 40 is perpendicular to the plane of the figure. Advantageously, said off-center groove extends according to a direction transverse to the line segment joining the first waveguide end 7 and the second waveguide end 8. In a particular embodiment, the off-center groove extends parallel to the input face 1 from a side face 5 of the substrate to the opposite side face 5 of the substrate. According to particular aspects, the off-center groove 40 has a rectangular section, a square section, a dovetail section, a polygonal section. Still advantageously, the off-center groove is filled with an optically absorbing or opaque material.

According to a variant of this embodiment, the IOC includes two off-center grooves arranged symmetrically with respect to the median plane, the two off-center grooves being separated from each other by a distance equal to one third of the substrate length L. In this embodiment with two off-center grooves, the IOC is also deprived of any central groove (25a and/or 25b). Advantageously, the integrated optical circuit includes a second off-center groove arranged between the input face 1 and the median plane 17. For example, the second off-center groove is arranged symmetrically to the first off-center groove 40 with respect to the median plane 17. A second off-center groove allows, symmetrically to the first off-center groove 40, attenuating or suppressing a primary reflection beam of a non-guided optical beam coming from the second end 8 and propagating in the substrate towards the first waveguide end 7, by reflection at the middle of the lower face 4.

The presence of an off-center groove with respect to the primary reflection point 13a, instead of a central groove, allows reducing drastically the effect of the primary specular reflection on the bottom of the groove at the second waveguide end on the output face. Indeed, by comparison with a central groove, an off-center groove offsets this specular reflection. The invention also makes it possible to considerably reduce the rate of spurious light transmitted by primary reflection on the lower face of an integrated optical circuit between a first and a second waveguide ends.

The embodiments described hereinabove suppress the central groove and replace it by an off-center groove, which allows avoiding the spurious specular reflections occurring on the bottom of a central groove and that are, by symmetry, directed exactly towards the second end of the waveguide.

The invention makes is possible to reduce the transmission of spurious light coming from a non-guided optical beam reflecting by primary reflection on the lower face of an integrated optical circuit. In the case of an integrated optical circuit of the polarizer type formed by proton exchange on a lithium niobate substrate, the invention makes it possible to improve the extinction rate of the polarizer.

The invention advantageously applies to an integrated optical circuit comprising a plurality of optical waveguides, to reduce the rate of spurious coupling between a first end of a first waveguide located on the input face of the IOC and another end of another waveguide located on the output face of the IOC.

The invention claimed is:

1. An integrated optical circuit comprising:
   a substrate, said substrate including an input face, an output face, a lower face, an upper face and two side faces, said lower face, upper face and side faces extending between the input face and the output face, the upper face being planar and opposite to the lower face;
   at least one optical waveguide located in a plane parallel to the upper face, said at least one optical waveguide extending between said input face and said output face;
   at least one first waveguide end located on the input face of the substrate and at least one second waveguide end located on the output face of the substrate;
   said integrated optical circuit being capable of receiving an incident optical beam on said first waveguide end, of forming a guided optical beam propagating in an optically guided manner, and of forming a non-guided optical beam propagating in a non-guided manner in the substrate,
   wherein, there being defined a median plane perpendicular to the upper face and to a line segment joining the first and the second waveguide ends, said median plane passing through the middle of said line segment, and an incidence plane perpendicular to the median plane, said incidence plane passing through the first end and the second end,
   said integrated optical circuit does not include a central groove but instead includes at least one groove off-centered with respect to the median plane, said at least one off-center groove extending from the lower face to an inside of the substrate, said at least one off-center groove being located at a non-zero distance d from said median plane, said at least one off-center groove having a height h in the incidence plane, said height h being higher than a minimum height $h_{min}$, such that:

$$h_{min} = \frac{2 \times e \times d}{L} + \sqrt{\frac{D \times \lambda}{2}}$$

where L represents the length of the substrate, e the thickness of the substrate, d the distance between said off-center groove and the median plane, $\lambda$ the wavelength in the material of a non-guided optical beam in the substrate, and D is equal to (L/2−d), said at least one off-center groove being capable of attenuating said non-guided optical beam transmitted by said substrate between said first end and said second end.

2. The integrated optical circuit according to claim 1, wherein said at least one off-center groove has a width w such that:

$$w \gg \frac{\lambda}{2 \times \theta_S \times (\theta'_S - \theta_S)}$$

so as to limit the angle of diffraction on the bottom of the off-center groove, where $\theta_S$ represents the grazing incidence angle of a non-guided optical beam on the bottom of said off-center groove and $\theta'_S$ represents the angle formed between the upper face of the substrate and a segment extending from the middle of the bottom of the groove to the second end of the waveguide.

3. The integrated optical circuit according to claim 1, wherein said at least one off-center groove extends in a plane parallel to the median plane.

4. The integrated optical circuit according to claim 1, wherein said at least one off-center groove extends in a plane parallel to the input face and/or the output face of the substrate.

5. The integrated optical circuit according to claim 1, wherein said at least one off-center groove includes a flat bottom.

6. The integrated optical circuit according to claim 5, wherein said flat bottom has an optically polished surface so as to limit the diffusion towards the second end.

7. The integrated optical circuit according to claim 1, including a single one off-center groove extending from the lower face to the inside of the substrate.

8. The integrated optical circuit according to claim 1, wherein said at least one groove has a rectangular, trapezoidal or dovetail section.

9. The integrated optical circuit according to claim 1, wherein said at least one off-center groove extends from a side face of the substrate to the opposite side face of the substrate.

10. The integrated optical circuit according to claim 1, wherein said substrate is a lithium niobate crystal and said at least one waveguide is a polarizer waveguide formed by proton exchange.

11. The integrated optical circuit according to claim 2, wherein said at least one off-center groove extends in a plane parallel to the median plane.

12. The integrated optical circuit according to claim 2, wherein said at least one off-center groove extends in a plane parallel to the input face and/or the output face of the substrate.

13. The integrated optical circuit according to claim 2, wherein said at least one off-center groove includes a flat bottom.

14. The integrated optical circuit according to claim 3, wherein said at least one off-center groove includes a flat bottom.

15. The integrated optical circuit according to claim 4, wherein said at least one off-center groove includes a flat bottom.

16. An integrated optical circuit comprising:
a substrate, said substrate including an input face, an output face, a lower face, an upper face and two side faces, said lower face, upper face and side faces extending between the input face and the output face, the upper face being planar and opposite to the lower face;
at least one optical waveguide located in a plane parallel to the upper face, said at least one optical waveguide extending between said input face and said output face;
at least one first waveguide end located on the input face of the substrate and at least one second waveguide end located on the output face of the substrate;
said integrated optical circuit being capable of receiving an incident optical beam on said first waveguide end, of forming a guided optical beam propagating in an optically guided manner, and of forming a non-guided optical beam propagating in a non-guided manner in the substrate,
wherein, there being defined a median plane perpendicular to the upper face and to a line segment joining the first and the second waveguide ends, said median plane passing through the middle of said line segment, and an incidence plane perpendicular to the median plane, said incidence plane passing through the first end and the second end,
said integrated optical circuit includes at least one groove off-centered with respect to the median plane, said at least one off-center groove extending from the lower face to an inside of the substrate, said at least one off-center groove being located at a non-zero distance d from said median plane, said at least one off-center groove having a height h in the incidence plane, said height h being higher than a minimum height $h_{min}$, such that:

$$h_{min} = \frac{2 \times e \times d}{L} + \sqrt{\frac{D \times \lambda}{2}}$$

where L represents the length of the substrate, e the thickness of the substrate, d the distance between said off-center groove and the median plane, $\lambda$ the wavelength in the material of a non-guided optical beam in the substrate, and D is equal to (L/2−d), said at least one off-center groove being capable of attenuating said non-guided optical beam transmitted by said substrate between said first end and said second end; wherein the integrated optical circuit comprises only one or more off-center grooves.

17. The integrated optical circuit according to claim 16, wherein said at least one off-center groove has a width w such that:

$$w \gg \frac{\lambda}{2 \times \theta_S \times (\theta'_S - \theta_S)}$$

so as to limit the angle of diffraction on the bottom of the off-center groove, where $\theta_S$ represents the grazing incidence angle of a non-guided optical beam on the bottom of said off-center groove and $\theta'_S$ represents the angle formed between the upper face of the substrate and a segment extending from the middle of the bottom of the groove to the second end of the waveguide.

18. The integrated optical circuit according to claim 16, wherein said at least one off-center groove extends in a plane parallel to the median plane.

19. The integrated optical circuit according to claim 16, wherein said at least one off-center groove extends in a plane parallel to the input face and/or the output face of the substrate.

20. The integrated optical circuit according to claim 16, wherein said at least one off-center groove includes a flat bottom.

* * * * *